W. J. BEST.
BROILER.
APPLICATION FILED NOV. 18, 1912.

1,093,245. Patented Apr. 14, 1914.

WITNESSES:
J. H. Perrault
Hugo W. Kreinbring

INVENTOR
William J. Best,
BY
Edward N. Pagelsen
ATTORNEY

UNITED STATES PATENT OFFICE.

WILLIAM J. BEST, OF DETROIT, MICHIGAN, ASSIGNOR TO BEST STOVE COMPANY, OF DETROIT, MICHIGAN, A CORPORATION OF MICHIGAN.

BROILER.

1,093,245.  Specification of Letters Patent.  Patented Apr. 14, 1914.

Application filed November 18, 1912. Serial No. 732,046.

*To all whom it may concern:*

Be it known that I, WILLIAM J. BEST, a citizen of the United States, and a resident of Detroit, in the county of Wayne and State of Michigan, have invented a new and Improved Broiler, of which the following is a specification.

This invention relates to the construction of culinary utensils particularly adapted for use in gas-heated ranges, and its object is to provide means to prevent the fats in the bottom of broiler-pans from igniting, and to provide means whereby these fats will be collected so they may be used for food.

This invention consists in connection with the ordinary grid-iron, of a bottom plate which slopes downward from its edges toward the center, and which is designed to collect the fats which drip from the meat on the grid-iron, of a small receptacle, preferably a small frying pan to receive the fats which flow through a hole in the center of this bottom plate, and of a frame or bracket connected to the lower side of the concave bottom plate and adapted to hold the frying pan in position.

Figure 3:
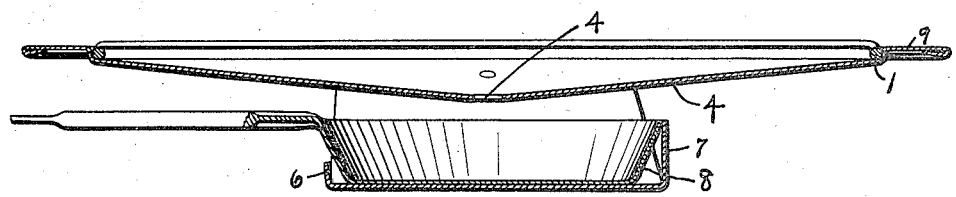
Figure 2:
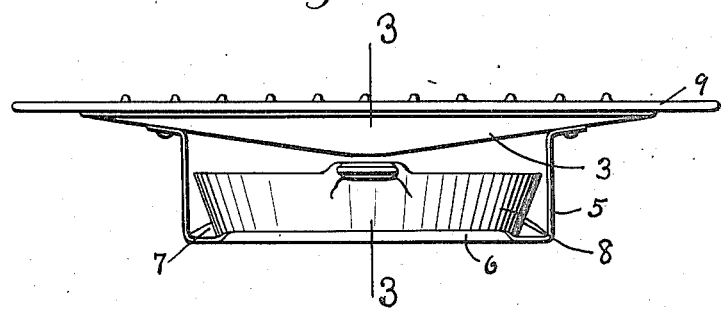
Figure 1:
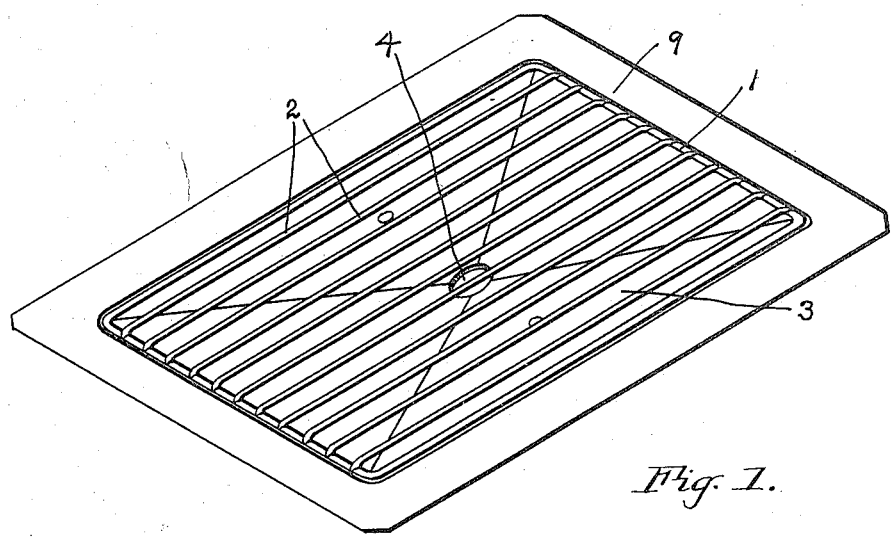

In the accompanying drawing Figure 1 is a perspective of this improved broiler. Fig. 2 is an end view of the same showing the spider in position. Fig. 3 is a central, vertical section on the line 3—3 of Fig. 2.

Similar reference characters refer to like parts throughout the several views.

The fats in the bottom of the pans below the grid-irons of broilers often ignite and the meats on the grid-irons are injured thereby, if not ruined. The reason is that the heat from the burners volatilizes a portion of the fats and the resulting vapors are ignited by the flame of the burners, and communicate this flame to the broiling meats and to the fats in the drip-pans. These flames are of gases which issue from perforated pipes which extend immediately above the grid-irons and are usually so close to the meats that these vapors ignite readily. To prevent this, a shallow pan or bottom plate has been provided, preferably concave downward, and with a hole in the lowest portion wherethrough the fats which drip from the meats may pass into a receptacle, a frying pan preferred, which fats will be shielded from the intense heat from the burners by means of this plate.

In the drawings the broiler grid-iron is shown constructed of a rod 1 bent to form a rectangular frame, onto which the cross-rods 2 are secured at their ends, preferably by electrically welding. After this construction has been properly finished, it may be cleaned and then dipped in melted tin in order to prevent rusting. The shield or bottom plate 3 is concave downward and has a hole 4 in its lowermost portion, preferably in the middle of the bottom, through which the fats will flow into the drip-pan. A plate of sheet metal 5 is bent to form a bracket that may be secured to the bottom and have upturned edges 6 and 7 to hold the small pan 8 in position, as shown in Figs. 2 and 3. After the meats have been cooked, this small pan 8 may be removed and the collected fats may be further treated to render them palatable.

While this broiler is shown rectangular, any other desired shape may be given to it. The bottom plate will shield the fats in the pan 8 sufficiently to prevent them from burning, but the heat of the broiler chamber and of this plate will be sufficient to keep the fats melted. After the plate 3 and bracket 5 have been united and properly finished, they also may be cleaned and dipped in tin to prevent discoloration and rusting. The upper surface of the plate 3 is preferably formed with a raised border 9 so that the grid-iron will be held in central position at all times.

I claim—

1. The herein described meat broiler consisting of a plate having a raised border and having the portion within the border sloping downward from all sides toward an aperture, a receptacle below the aperture and a bracket connected to the bottom of the plate having upturned edges to position and support said receptacle below the aperture.

2. The herein described meat broiler consisting of a plate sloping downward from all sides toward an aperture, a receptacle below the aperture, and a bracket connected to the bottom of the plate to position and support said receptacle below the aperture, said bracket having front and rear flanges to position said receptacle.

In testimony whereof I have signed this specification in the presence of two subscribing witnesses.

WILLIAM J. BEST.

Witnesses:
EDWARD N. PAGELSEN,
HUGO W. KREINBRING.